(12) United States Patent
Estrella Chavez et al.

(10) Patent No.: US 10,085,296 B1
(45) Date of Patent: Sep. 25, 2018

(54) PRE-ESTABLISHMENT AND USE OF ACCESS NETWORK CONNECTIONS TO HELP EXPEDITE ATTACHMENT

(71) Applicant: Sprint Spectrum L.P., Overland Park, KS (US)

(72) Inventors: Diego Estrella Chavez, Reston, VA (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 63 days.

(21) Appl. No.: 15/184,154

(22) Filed: Jun. 16, 2016

(51) Int. Cl.
| | |
|---|---|
| *H04W 76/12* | (2018.01) |
| *H04W 8/26* | (2009.01) |
| *H04W 76/11* | (2018.01) |
| *H04W 76/02* | (2009.01) |

(52) U.S. Cl.
CPC ............ *H04W 76/12* (2018.02); *H04W 8/26* (2013.01); *H04W 76/021* (2013.01); *H04W 76/022* (2013.01); *H04W 76/11* (2018.02)

(58) Field of Classification Search
CPC .... H04W 76/022; H04W 8/26; H04W 76/021
See application file for complete search history.

(56) References Cited

U.S. PATENT DOCUMENTS

| | | | | |
|---|---|---|---|---|
| 8,514,756 | B1* | 8/2013 | Ramachandra | H04W 76/002 370/310 |
| 9,210,596 | B1* | 12/2015 | Chen | H04W 76/028 |
| 9,332,561 | B1* | 5/2016 | Khawam | H04L 65/1069 |
| 2004/0233907 | A1* | 11/2004 | Hundscheidt | H04L 12/185 370/390 |
| 2007/0280264 | A1* | 12/2007 | Milton | H04W 36/0022 370/395.31 |
| 2016/0007316 | A1* | 1/2016 | Vaidya | H04W 64/003 370/312 |
| 2016/0044721 | A1* | 2/2016 | Mhatre | H04W 76/022 370/329 |

* cited by examiner

*Primary Examiner* — Alex Skripnikov
*Assistant Examiner* — Sharmin Chowdhury (57) ABSTRACT

Disclosed is a method and system in which connections are pre-established without any UE association and are then a pre-established connection is selected and associated with a UE when the UE seeks to attach. Each pre-established connection could include an S5 tunnel between an SGW and PGW and an IP address assignment. And upon UE attachment, an MME could readily signal with a base station to establish an S1-U tunnel for the UE, and to convey the IP address assignment to the UE, without having to wait for establishment of the S5 tunnel and assignment of the IP address, and the MME could further signal with the SGW to cause the S5 tunnel and IP address assignment to be made UE specific and to tie the S5 tunnel with the newly established S1-U tunnel. Further, the quantity and service level of connections pre-established could be based on historical trends.

19 Claims, 4 Drawing Sheets

PRE-ESTABLISHMENT AND USE OF ACCESS NETWORK CONNECTIONS TO HELP EXPEDITE ATTACHMENT

BACKGROUND

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

OVERVIEW

When a cellular wireless network serves UEs, the network may allocate various resources to facilitate communication to and from the UEs. In an example arrangement, for instance, the network may allocate bearers that define physical or logical communication channels extending between the UEs and a transport network. Each such bearer may include a radio-bearer component that extends between a UE and a serving base station and an access-bearer component that extends between the serving base station and the transport network. More particularly, in a representative network having a base station, a serving gateway (SGW), and a packet-data-network gateway (PGW) that provides connectivity with a packet-switched network, each bearer may include (i) a radio bearer interface between the UE and the base station, (ii) an S1-U tunnel between the base station and the SGW, and (iii) an S5 tunnel between the SGW and the PGW. With this arrangement, packet-data can flow between the UE and the packet-switched network via a path including the radio bearer, the S1-U tunnel, and the S5 tunnel.

Further, each such bearer may have an associated service level, which could define how the network nodes in the bearer communication path will handle traffic on the bearer, so as to support a particular quality of service or type of service. And the network may allocate a number of such bearers for a UE, to support various different types of communication services.

By way of example, when the UE first enters into coverage of a base station, the UE may initiate an attachment process that causes the network to establish for the UE certain bearers in accordance with the UE's service profile. For instance, if the UE's service profile indicates that the UE supports general packet-data communication (such as web browsing, file transfer, and the like), the network may establish for the UE a bearer for carrying such communications with a best-effort service level. Further, if the UE's service profile indicates that the UE supports voice over Internet Protocol (VoIP) communications or other such real-time packet-based communication service, the network may establish for the UE a bearer to support Session Initiation Protocol (SIP) signaling or the like to facilitate setup of such communications.

To initiate attachment, the UE and base station may first engage in a random access communication and radio-link setup signaling to establish a radio-link-layer connection between the UE and the base station, the base station may establish in data storage a context record for the UE, and the UE may transmit via the radio-link-layer connection an attach request, which the base station may forward to a mobility management entity (MME). Upon authentication of the UE, the MME may then engage in a process to establish a UE-specific signaling tunnel between the MME and the SGW, and to establish for the UE one or more bearers each including the S5 and S1-U tunnels noted above.

In the representative network described above, for instance, an MME may establish in data storage a context record for the UE, keyed to a UE identifier such as an International Mobile Subscriber Identity (IMSI), and the MME may store in the context record an indication of each communication service that the UE supports. In addition, for each bearer to be established for the UE, the MME may allocate and store in the UE context record a respective bearer ID (e.g., an evolved packet system (EPS) bearer ID), along with an indication of a service level of the bearer, such as an associated quality of service class identifier (QCI) for instance.

The MME may then send to the SGW a create-session request message, which may carry the UEID, an MME tunnel-endpoint identifier (TEID) for an S11 tunnel, and the bearer ID and service level respectively of each bearer to be established for the UE, among other information. Upon receipt of the create-session request from the MME, the SGW may then establish in data storage a context record for the UE, indicating the UEID, the MME TEID, and the bearer ID and service level for each such bearer, among other information. And the SGW may transmit to the PGW a corresponding create-session request, which may carry the UEID, and for each bearer a respective SGW TEID for an S5 tunnel and the bearer ID and service level, and among other information.

In turn, the PGW may then establish in data storage a context record for the UE, indicating the UEID, and for each bearer the respective SGW TEID and the bearer ID and service level, among other information, and the PGW may assign an IP address for use by the UE. The PGW may then transmit a create-session response to the SGW, which may carry the assigned IP address and, for each bearer, a PGW TEID for the S5 tunnel, among other information. And for each such bearer, the SGW may record in its UE context record the PGW TEID, among other information. Further, the SGW may then transmit a create-session response to the MME, which may carry an SGW TEID for the S11 tunnel as well as, for each bearer, an SGW TEID for an S1-U tunnel, among other information.

At this stage, the S11 signaling tunnel is thus established for the UE between the MME and the SGW, with the MME and SGW having each other's TEIDs for the S11 tunnel. Further, the S5 and S11 tunnels are established respectively for the bearer being set up for the UE, with the SGW and PGW having each other's TEIDs for the S5 tunnel of the bearer and having established context records for the UE indicating each bearer's ID and service level.

Having established the S5 tunnel for each such bearer, the MME may then engage in further signaling to establish for the bearer the S1-U tunnel between the base station and the SGW and to complete the attachment process. In particular, the MME may next transmit to the base station an initial context setup request message, which may carry for each bearer the SGW TEID for the S1-U tunnel, as well as an attach accept message and an activate bearer request message specifying the assigned IP address, among other information. The base station may record in its UE context record, for each bearer, the SGW TED for the S1-U tunnel. And the base station may forward the attach accept and activate bearer request messages with assigned IP address via the radio-link-layer connection to the UE and transmit to the MME an initial context setup response message, which may carry for each bearer a base station TEID for the S1-U tunnel, among other information, and the MME may pass the base station's TEID to the SGW. Thus, the UE would then have its assigned IP address, and for each bearer the S1-U tunnel would be established for the UE, with the base station and SGW having each other's TEIDs for the S1-U tunnel, thus completing the bearer establishment process.

Unfortunately, however, this attachment and bearer establishment process is relatively time consuming. In particular, once the MME receives the UE's attach request and the MME sends a create-session request to the SGW, the MME must wait for the SGW and PGW to engage in signaling with each other, for the PGW to assign an IP address, and for the SGW to respond to the MME, before the MME would then work to set up the S1-U tunnel and finish the process.

Disclosed herein is an improved process, in which dummy or placeholder connections are pre-established without any UE association to start, and when a UE then attaches, one of the pre-established connections is then quickly assigned for use as part of a bearer for the UE. In the representative network arrangement, for instance, each pre-established connection could include an S5 tunnel between the SGW and PGW and could have an associated/assigned IP address for communicating on the packet-switched network. Further, multiple such connections could be pre-established based on projections of numbers of bearers that would be needed at particular times of day and with quality of service levels based on similar projections. In turn, when a UE requests attachment, the MME could then simply select one of the pre-established connections, establish an S1-U tunnel for the UE and provide the UE with the assigned IP address, and quickly direct the SGW to bridge the S1 tunnel with the S5 tunnel of the selected pre-established connection. With this process, the MME need not wait for the S5 tunnel to be established and an IP address to be assigned before the MME sets up the S1-U tunnel, as the S5 tunnel and IP address assignment occurs in advance of the UE requesting attachment. Thus, the process can expedite attachment overall.

Accordingly, in one respect, disclosed is a method operable in an access network comprising a base station, an SGW, and a PGW, where the PGW provides connectivity with a packet-switched network. The method includes pre-establishing in the access network a plurality of connections each including a respective first tunnel (e.g., S5 tunnel) between the SGW and the PGW, where the pre-established connections are not associated with any UEs. In turn, the method then includes, after pre-establishing in the access network the plurality of connections, the access network receiving from a UE an attach request. And the method then includes, responsive to the received attach request, (i) the access network selecting one of the pre-established connections and (ii) the access network assigning for the UE the selected pre-established connection to carry packet-data to and from the UE.

Further, in another respect, disclosed is a method for operable in an access network comprising a base station, an SGW, a PGW, and an MME, where the PGW provides connectivity with a packet-switched network. The method includes the MME engaging in connection pre-configuration signaling (pre-establishment signaling) with the SGW to pre-establish a plurality of connections each including a respective S5 tunnel between the SGW and the PGW and each including a respective S11 tunnel between the MME and the SGW, where the pre-established connections are not associated with any UEs (e.g., were not established for any particular UE in response to a UE's attach request). Further, the method includes, after pre-establishing the connections, the MME receiving from a UE, via the base station, an attach request.

The method then includes, responsive to the received attach request, (a) the MME selecting one of the pre-established connections and (b) the MME engaging in a process to make the selected pre-established connection specific to the UE. In particular, the process to make the selected pre-established connection specific to the UE includes (i) newly establishing for the UE an S1 tunnel between the base station and the SGW, and causing the SGW to bridge the newly established S1 tunnel with the S5 tunnel of the selected pre-established connection, (ii) causing the SGW, and in turn the PGW, to update context records for the selected pre-established connection to indicate that the selected pre-established connection is specifically for the UE, and (iii) updating a context record at the MME for the selected pre-established connection to indicate that the selected pre-established connection is specifically for the UE.

Still further, disclosed is an MME operable in an access network including a base station, an SGW, and a PGW, where the PGW provides connectivity with a packet-switched network. The MME includes a network communication interface configured to engage in communication with entities including the base station and the SGW, and the MME further includes a processing unit, non-transitory data storage, and program instructions stored in the non-transitory data storage and executable by the processing unit to cause the MME to carry out operations such as those discussed herein.

In a representative implementation, the MME operations include engaging in connection pre-establishment signaling with the SGW to pre-establish a plurality of connections each including a respective S5 tunnel between the SGW and the PGW and each including a respective S11 tunnel between the MME and the SGW, the pre-established connections not being associated with any UEs. Further, the operations include, after pre-establishing the connections, receiving from a UE, via the base station, an attach request. And the operations include responding to the received attach request by (a) selecting one of the pre-established connections and (b) engaging in the process noted above to make the selected pre-established connection specific to the UE.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
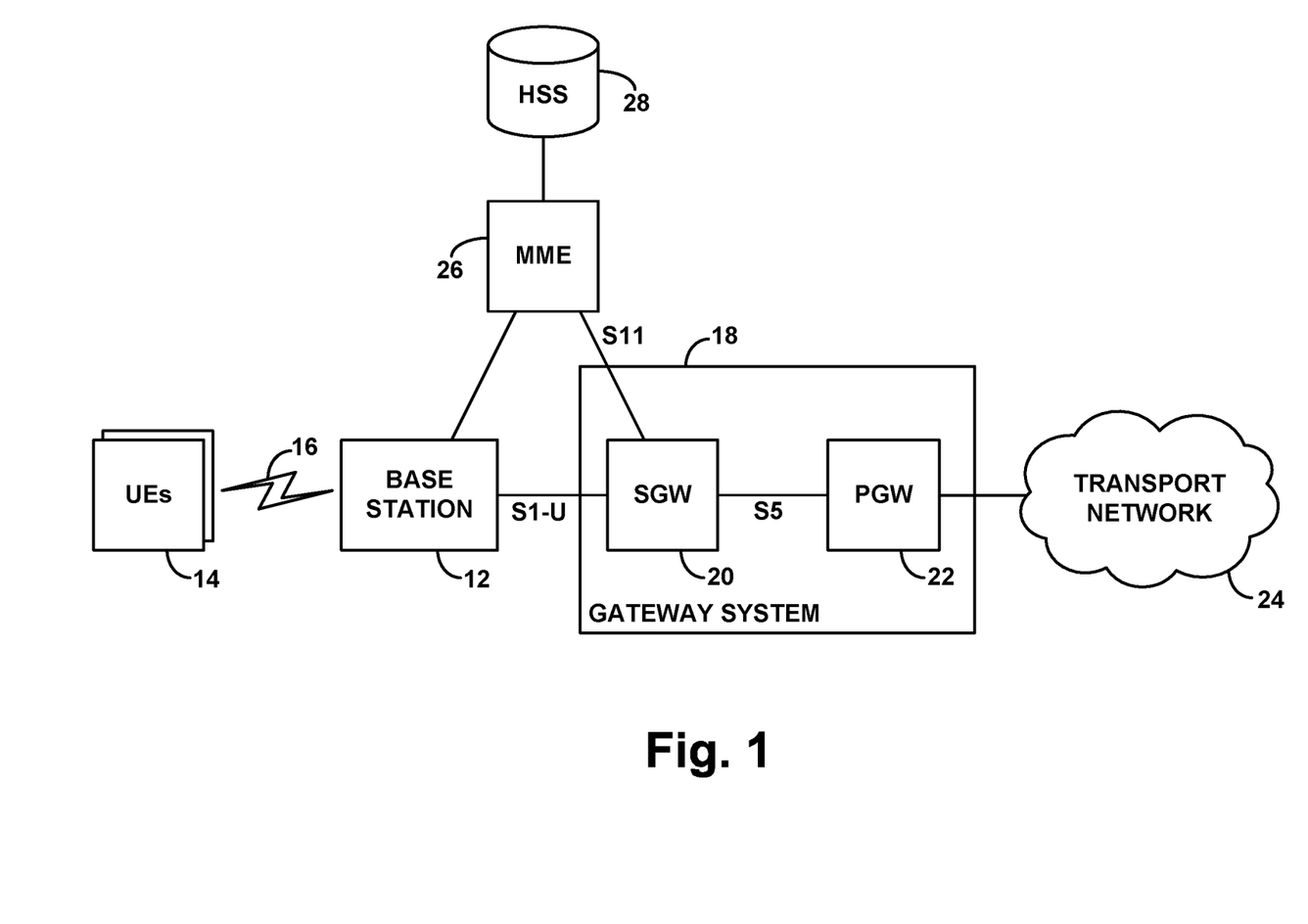
FIG. 1 is a simplified block diagram of a network arrangement in which aspects of the present disclosure can be implemented.

The arrangement of FIG. 1 includes by way of example a representative base station 12 and a plurality of UEs 14 within coverage of the base station 12. The base station and each UE may be configured to communicate with each other over a radio frequency air interface 16 according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed. For sake of example, and without limitation, the remainder of this disclosure will focus on an LTE implementation.

As illustrated, the example arrangement includes a gateway system 18 comprising a representative SGW 20 and a representative PGW 22. The SGW 20 is configured to communicate with the base station 12 and with the PGW 22. And the PGW 22 is then arranged to provide connectivity with a representative transport network 24 such as the Internet or a private packet-switched network for instance. In addition, the arrangement includes a representative MME 26, which is configured to communicate with the base station 12 and with the SGW. Further, the MME is configured to communicate with an HSS 28, which may store account and service profiles for various UEs.

In practice, many of these network components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network.

With the example arrangement shown, when each of the UEs 14 initially enters into coverage of network, the UE may engage in signaling with the base station 12 to establish a radio-link-layer connection such as a Radio Resource Control (RRC) connection for instance, the base station may establish a UE context record for the UE, and the UE may transmit an attach request over the radio-link-layer connection to the base station. This attach request may then cause the network to establish for the UE one or more bearers as described above.

In particular, as discussed above, the MME may establish a context record for the UE and may store in the context record an indication of bearer ID and service level of each bearer to be established for the UE. Further, the MME may engage in signaling with the SGW to establish for the UE an S11 signaling tunnel between the MME and SGW, with the SGW establishing a context record for the UE, and with the MME and SGW each storing in their respective UE context record an indication of the UE's ID and an indication of each other's TEIDs for the S11 tunnel. Moreover, the MME's signaling with the SGW may trigger signaling between the SGW and the PGW to establish for each one or more bearers a respective S5 tunnel between the SGW and the PGW, with the PGW establishing a context record for the UE and assigning an IP address for the UE, and with the SGW and PGW each storing in their respective UE context record an indication of the UE's ID and each other's TEIDs for the S5 tunnel.

As further discussed above, once the S5 tunnel is established for a bearer, the MME may then engage in signaling with the base station and the SGW to establish for the bearer an S1-U tunnel between the base station and the SGW and to provide the assigned IP address to the UE. In particular, the MME may transmit to the base station an initial context setup request message, providing for each bearer the SGW TEID for the S1-U tunnel, as well as an attach accept message and an activate bearer request message specifying the assigned IP address, among other information. The base station may then store in its UE context record the SGW TEID for the S1-U tunnel, forward the attach accept and activate bearer request messages with assigned IP address via the radio-link-layer connection to the UE, and transmit to the MME an initial context setup response message, providing a base station TEID for the S1-U tunnel, among other information. And the MME may pass the base station's TEID to the SGW, which the SGW may store in its UE context record.

As noted above, the present disclosure provides for streamlining this process by pre-establishing a plurality of connections that are not yet associated with any UEs, and then, when a UE seeks to attach, selecting at least one of the pre-established connections and using each selected connection as part of a bearer for the UE. In an example implementation of this process, each such pre-established connection could include an S5 tunnel between the SGW and PGW as well as an associated assigned IP address. Advantageously, when the MME receives an attach request from a UE, the MME could the select such a pre-established connection and could readily initiate the S1-U setup process for the UE without needing to wait for establishment of the S5 tunnel. Further, in parallel with setup of the S1-U tunnel for the UE, the MME could signal to the SGW to cause the SGW and PGW to associate the S5 tunnel and IP address assignment specifically with the UE, thus to make the pre-established S5 tunnel and IP address assignment be UE-specific.

In the example implementation, each pre-established connection could be for a respective bearer of a particular service level, though the full bearer will not yet be established. For instance, some of the pre-established connections could for default general packet-data bearers, while others could be for SIP signaling bearers, and others could be for bearers of other service levels.

In practice, the quantity of each service level of connection that is pre-established could be determined based on historical records of the number of bearers of that service level that have been established at particular times or the like. For instance, if at particular times of day, many general packet-data bearers are typically established, then many connections for general packet-data bearers could be pre-established leading up to that time of day, to be ready for use to more quickly establish those bearers when necessary.

Further, groups of pre-established connections could be established based on historical records of the number of groups of bearers that have been established, also perhaps with quantities based on the quantity of such groups of bearers that have been established. For instance, if at particular times of day, the network tends to establish for each of many UEs both a general packet-data bearer and a SIP signaling bearer, then many groups of connections for those two types of bearers could be pre-established leading up to that time of day, to be ready to more quickly establish those groups of bearers for UEs when necessary.

In practice, the MME, SGW, and PGW could be programmed to engage in pre-configuration signaling with each other, to establish placeholder context records and tunnels that are not associated with any UEs, defining these pre-established connections. In particular, the MME could evaluate past records of bearer establishment as a basis to predict how many bearers of particular service levels will be required, and what groups of bearers will be required, and the MME could then engage in pre-configuration signaling to pre-establish connections accordingly.

As an example of this, the MME could predict that a plurality of attachments are likely to occur at a particular time of day and that each attachment will result in establishment of just a general packet-data bearer. In anticipation of those attachments, the MME could then initiate the pre-configuration process for each attachment. In particular, the MME could establish in data storage a placeholder context record (not associated with any UE) and could allocate and store in the context record a bearer ID for general packet-data bearer and flag the context record as a placeholder record (unassociated with any UE).

The MME could then transmit to the SGW a "create-preconfigured-session" message, which may not carry a UEID or may carry a dummy UEID (not associated with an actual UE), an MME TED for an S11 tunnel, and the bearer ID and service level for the bearer, among other information. Upon receipt of the create-preconfigured-session request from the MME, the SGW may then establish in data storage a placeholder context record (not associated with any UE), indicating the MME TEID, and the bearer ID and service level, among other information. And the SGW may transmit to the PGW a corresponding create-preconfigured-session request, which may carry an SGW TEID for an S5 tunnel and the bearer ID and service level, and among other information.

In turn, the PGW may then establish in data storage a placeholder context record indicating the SGW TEID and the bearer ID and service level, among other information, and the PGW may assign an IP address (not associated with any particular UE). The PGW may then transmit a create-preconfigured-session response to the SGW, which may carry the assigned IP address and a PGW TEID for the S5 tunnel, among other information. And the SGW may record in its placeholder context record the PGW TED, among other information. Further, the SGW may then transmit a create-preconfigured-session response to the MME, which may carry an SGW TED for the S11 tunnel as well as the assigned IP address and an SGW TEID for an S1-U tunnel (to be established later), among other information. And the MME may store in its placeholder context record the SGW TEIDs for the S11 and S1-U tunnels as well as the assigned IP address, all still not associated with any UE.

Further, as another example of this, the MME could predict that a plurality of attachments are likely to occur at a particular time of day and that each attachment will result in establishment of both a general packet-data bearer and a SIP signaling bearer. In anticipation of those attachments, the MME could then initiate the pre-configuration process for each attachment. Here, the MME could establish in data storage a placeholder context record (not associated with any UE) and could allocate and store in the context record a bearer ID for general packet-data bearer and a bearer ID for a SIP signaling bearer, and the MME could flag the context record as a placeholder record (unassociated with any UE).

The MME could then transmit to the SGW a create-preconfigured-session message, which may not carry a UEID or may carry a dummy UEID (not associated with an actual UE), an MME TEID for an S11 tunnel, and, for each bearer, the bearer ID and service level for the bearer, among other information. Upon receipt of the create-preconfigured-session request from the MME, the SGW may then establish in data storage a placeholder context record (not associated with any UE), indicating the MME TEID, and, for each bearer, the bearer ID and service level, among other information. And the SGW may transmit to the PGW a corresponding create-preconfigured-session request, which may carry for each bearer an SGW TEID for an S5 tunnel and the bearer ID and service level, and among other information.

In turn, the PGW may then establish in data storage a placeholder context record indicating for each bearer the SGW TED and the bearer ID and service level, among other information, and the PGW may assign an IP address (not associated with any particular UE). The PGW may then transmit a create-preconfigured-session response to the SGW, which may carry the assigned IP address and, for each bearer, a PGW TED for the S5 tunnel, among other information. And the SGW may record in its placeholder context record the PGW TEID for each bearer, among other information. Further, the SGW may then transmit a create-preconfigured-session response to the MME, which may carry an SGW TEID for the S11 tunnel, the assigned IP address, and, for each bearer, an SGW TEID for an S1-U tunnel (to be established later), among other information. And the MME may store in its placeholder context record the SGW TEIDs for the S11 and S1-U tunnels as well as the assigned IP address, all still not associated with any UE.

After pre-establishing various connections through the above or another process, the MME may conveniently make use of the pre-established connections to expedite bearer setup and overall attachment for UEs. In particular, when a UE later enters into coverage of a base station and transmits an attach request, the MME would receive the attach request and could then select and make use of one or more particular pre-established connections. After authentication and authorization of the UE and determining which types of bearers are to be established for the UE, the MME could then select a pre-established connection or group of pre-established connections and readily engage in signaling with the base station and SGW to establish one or more S1-U tunnels for the UE and to associate the established S1-U tunnels with the pre-configured connection(s).

As an example of this, if the MME receives an attach request from a UE and determines that the UE should have just a general packet-data bearer, then the MME could select one of the placeholder context records that was established for just a general packet-data bearer and could update the context record to indicate the UE's ID, so as to make the context record UE-specific. Further, the MME could read the context record to determine the SGW TEIDs for the S11 and S1-U tunnels and the assigned IP address, now all for the UE at issue. And the MME could readily transmit to the base station an initial context setup request message, carrying the SGW TEID for the S1-U tunnel as well as an attach accept message and an activate bearer request message specifying the assigned IP address, among other information. And the base station could store that SGW TEID information and IP address information in its UE context record and forward the attach accept and activate bearer request messages with assigned IP address via the radio-link-layer connection to the UE and transmit to the MME an initial context setup response message, carrying a base station TEID for the S1-U tunnel, among other information.

Once the MME receives from the base station the base station's TEID for the S1-U tunnel, or earlier if possible, the MME may then engage in signaling to associate the pre-established S5 tunnel and IP address specifically with the UE and to tie the S5 tunnel with the S1-U tunnel. For example, the MME may transmit to the SGW an "update-preconfig-ured-session" request, carrying the bearer ID and the UEID, as well as the base station's TEID for the S1-U tunnel. And the SGW may responsively store that base station TEID and the UEID in the placeholder context record associated with the bearer ID, thus making the context-record specific and S5 tunnel UE-specific (from the SGW's perspective), and the SGW may then bridge (e.g., record a correlation between) the UE's S1-U tunnel with the pre-established S5 tunnel, to allow full bearer communication. Further, the SGW may similarly transmit to the PGW an update-precon-figured-session request, carrying the bearer ID and the UEID, and the PGW may responsively store that UEID in the placeholder context record associated with the bearer ID, thus making the context-record, S5 tunnel and IP address assignment specific to the UE.

As another example of this, if the MME receives an attach request from a UE and determines that the UE should have a general packet-data bearer and a SIP signaling bearer, then the MME could select one of the placeholder context records that was established for both such bearers and could update the context record to indicate the UE's ID, so as to make the context record UE-specific. Further, the MME could read the context record to determine the SGW TEIDs for the S11 and S1-U tunnels and the assigned IP address, now all for the UE at issue. And the MME could readily transmit to the base station an initial context setup request message, carrying the SGW TEID respectively for each bearer's S1-U tunnel as well as an attach accept message and an activate bearer request message specifying the assigned IP address, among other information. And the base station could then store the SGW TED information in its UE context record and forward the attach accept and activate bearer request messages with assigned IP address via the radio-link-layer connection to the UE and transmit to the MME an initial context setup response message, carrying a base station TED respectively for each S1-U tunnel, among other information.

Once the MME receives from the base station the base station's TED for each S1-U tunnel, the MME may then engage in signaling to associate each pre-established S5 tunnel and IP address specifically with the UE and to tie each S5 tunnel with an S1-U tunnel. For example, the MME may transmit to the SGW an update-preconfigured-session request, carrying each bearer ID and the UEID, as well as the base station's TEID respectively for each S1-U tunnel. And the SGW may responsively store those base station TEIDs and the UEID in the placeholder context record associated with each bearer ID, thus making the context-record specific and S5 tunnels UE-specific, and bridging (recording a correlation between) the UE's S1-U tunnels and the pre-established S5 tunnels. Further, the SGW may similarly transmit to the PGW an update-preconfigured-session request, carrying the UEID and the bearer ID of each bearer, and the PGW may responsively store that UEID in the placeholder context record associated with the bearer IDs, thus making the context-record, S5 tunnel and IP address assignment UE-specific.

Figure 2:
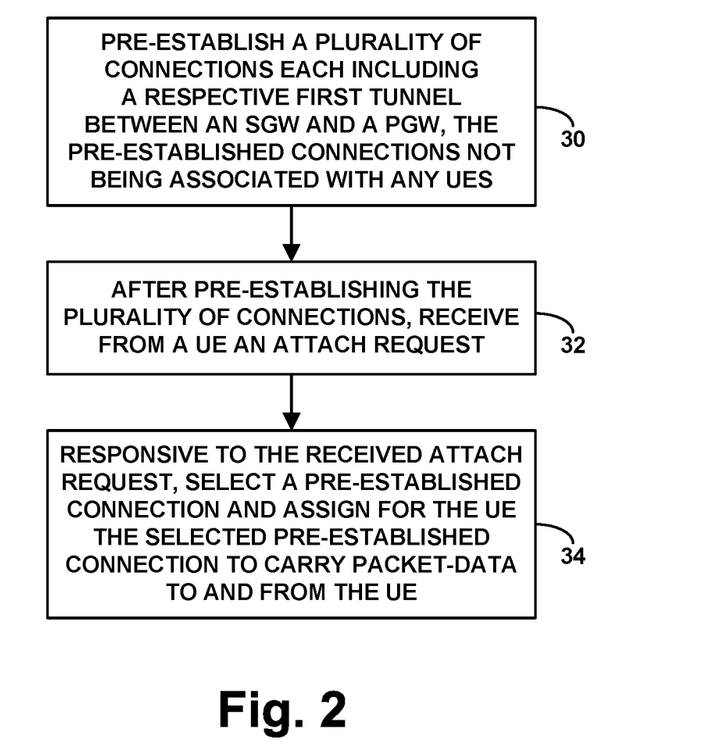
FIG. 2 is a flow chart depicting operations that can be carried out in accordance with the disclosure.

FIG. 2 is next a flow chart depicting a method that can be carried out in accordance with the present disclosure. This method can be carried out in an access network such as that shown in FIG. 1 for instance, including a base station, an SGW, and a PGW, where the PGW provides connectivity with a packet-switched network, or in a network having some other configuration. As shown in FIG. 2, at block 30, the method includes pre-establishing in the access network a plurality of connections each including a respective first tunnel (e.g., an S5 tunnel or other tunnel) between the SGW and the PGW, wherein the pre-established connections are not associated with any UEs. At block 32, the method then includes, after pre-establishing in the access network the plurality of connections, receiving by the access network from a UE an attach request. And at block 34, the method includes, responsive to the received attach request, (i) selecting by the access network one of the pre-established connections and (ii) assigning by the access network, for the UE, the selected pre-established connection to carry packet-data to and from the UE.

In line with the discussion above, the act of pre-establishing each connection could include pre-establishing for each connection the respective first tunnel between the SGW and the PGW. And the method could further include, responsive to the received attach request, newly establishing for the UE a second tunnel (e.g., an S1 tunnel, such as an S1-U tunnel, or other tunnel) between the base station and the SGW. In that case, the act of assigning for the UE the selected pre-established connection to carry packet-data to and from the UE could include recording at the SGW a correlation between the newly established second tunnel and the first tunnel pre-established for the selected pre-established connection.

Further, the act of pre-establishing each connection could involve pre-establishing at the SGW an SGW context record for the connection (e.g., the placeholder context record noted above) and recording in the SGW context record a PGW TEID for the first tunnel pre-established for the connection, wherein the SGW context record is not associated with any UE. And then newly establishing for the UE the second tunnel could involve (i) establishing at the base station a base station context record for the connection and recording in the base station context record an SGW tunnel endpoint identifier for the second tunnel and (ii) recording in the SGW context record a base station tunnel endpoint identifier for the second tunnel.

The act of recording at the SGW the correlation between the newly established second tunnel and the first tunnel pre-established for the selected pre-established connection could involve recording the correlation in the SGW context record. Thus, in accordance with the correlation, the SGW could then bridge between the newly established second tunnel and the first tunnel pre-established for the selected pre-established connection, bearer communication between the base station and the PGW.

Further, as discussed above, the UE could have a UE ID, and the act of assigning for the UE the selected pre-established connection to carry packet-data to and from the UE could further include recording in the SGW context record the UE ID, as an indication that the SGW context record, the second tunnel, and the first tunnel are now for the UE. Moreover, pre-establishing each connection could include pre-establishing at the PGW a PGW context record for the connection (e.g., the placeholder context record discussed above) and recording in the PGW context record an SGW TEID identifier for the pre-established first tunnel, wherein the PGW context record is not associated with any UE. And assigning for the UE the selected pre-established connection to carry packet-data to and from the UE could additionally involve recording in the PGW context record the UE ID, as an indication that the PGW context record and the first tunnel are now for the UE.

Additionally in line with the discussion above, each pre-established connection could have a respective assigned IP address for communicating on the packet-switched network, and the PGW context record could further indicate the IP address of the pre-established connection, in which case recording in the PGW context record the UE ID could work to correlate the UE ID, and thus the UE, with the assigned IP address. Further, assigning for the UE the selected pre-established connection to carry packet-data to and from the UE further could involve assigning to the UE the respective assigned IP address of the selected pre-established connection, including transmitting to the UE an attach accept message that specifies the IP address as an IP address now assigned to the UE.

Still further, also in line with the discussion above, the act of pre-establishing the plurality of connections could involve projecting a quantity of connections based on historical connection-establishment trend data, and pre-establishing as the plurality of connections the projected quantity of connections. For instance, this could involve determining how many of particular service levels of bearers tend to be established at particular times or the like, and configuring an associated number of pre-established connections with such service levels.

Figure 3:
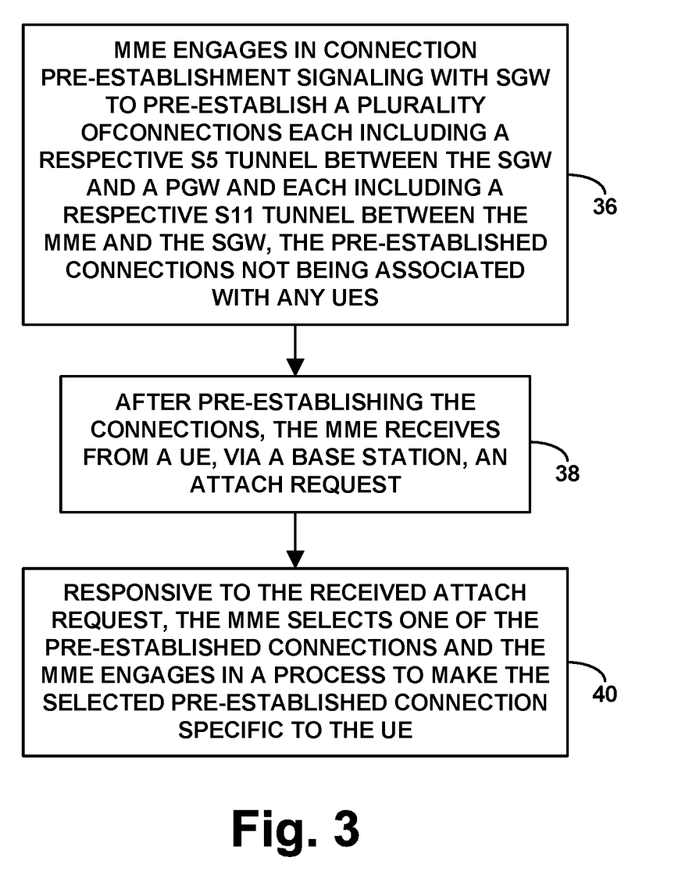
FIG. 3 is another flow chart depicting operations that can be carried out in accordance with the disclosure.

FIG. 3 is next another flow chart depicting a method that can be carried out in accordance with the present disclosure. This method as well could be carried out in an access network having a base station, an SGW, a PGW, and an MME, with the PGW providing connectivity with a packet-switched network, or in network of some other configuration.

As shown in FIG. 3, at block 36, the method includes the MME engaging in connection pre-establishment signaling with the SGW to pre-establish a plurality of connections each including a respective S5 tunnel between the SGW and the PGW and each including a respective S11 tunnel between the MME and the SGW, wherein the pre-established connections are not associated with any UEs. At block 38, the method then includes, after pre-establishing the connections, the MME receiving from a UE, via the base station, an attach request. And at block 40, the method includes, responsive to the received attach request, (a) the MME selecting one of the pre-established connections and (b) the MME engaging in a process to make the selected pre-established connection specific to the UE, possibly doing so for more than one such connection in a given implementation.

In line with the discussion above, the process to make the selected pre-established connection specific to the UE could then include (i) newly establishing for the UE an S1 tunnel between the base station and the SGW, and causing the SGW to bridge the newly established S1 tunnel with the S5 tunnel of the selected pre-established connection, (ii) causing the SGW, and in turn the PGW, to update context records for the selected pre-established connection to indicate that the selected pre-established connection is specifically for the UE, and (iii) updating a context record at the MME for the selected pre-established connection to indicate that the selected pre-established connection is specifically for the UE.

Other features described above can be applied in the context of this method as well. For example, each pre-established connection could have a respective assigned IP address for communicating on the packet-switched network, and the process to make the selected pre-established connection specific to the UE could further include assigning to the UE the respective assigned IP address of the pre-established connection, including transmitting to the UE, in an attach accept message in response to the attach message, the assigned IP address, for use by the UE. Further, the UE could have a UE ID, and updating the context records at the SGW, PGW, and MME could involve recording the UE ID in the context records. Moreover, pre-establishing the plurality of connections could involve projecting a quantity of connections based on historical connection-establishment trend data, and pre-establishing as the plurality of connections the projected quantity of connections, as well as configuring each pre-established connection to have a respective quality of service level selected based on historical connection-establishment trend data.

Through these methods, each pre-established connection could be associated with a single UE that attaches with the network, thereby helping to expedite the UE's attachment.

To facilitate implementation of the methods described above, the MME, SGW, and PGW, and/or one or more other such network entities, could each include a network communication interface for communicating with each other, as well as processing unit programmed with instructions executable to carry out the various operations described.

Figure 4:
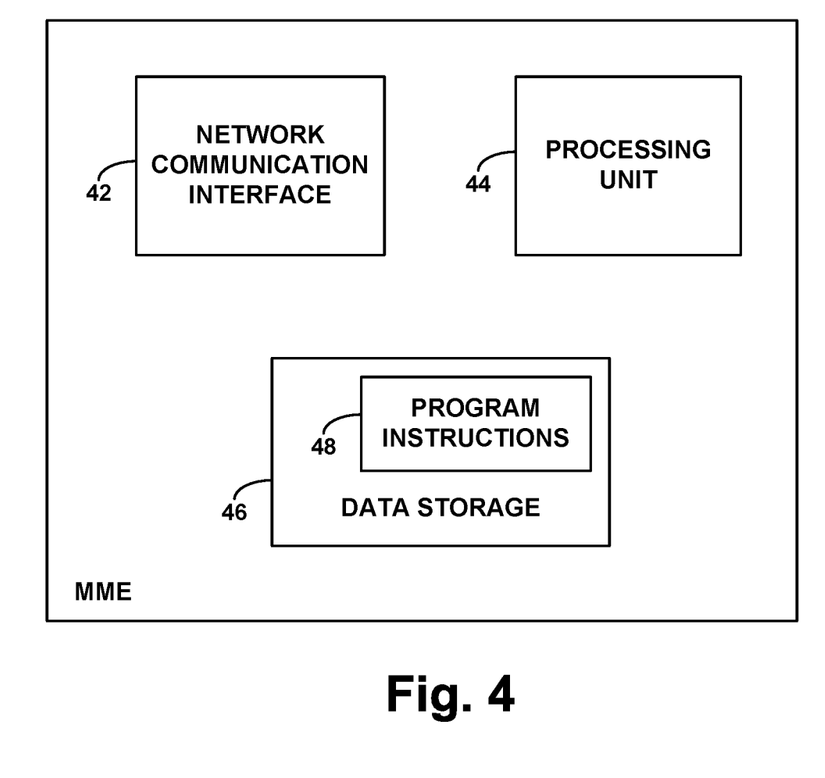
FIG. 4 is a simplified block diagram of an MME operable in accordance with the disclosure.

By way of example, FIG. 4 is a simplified block diagram of an MME operable in accordance with the disclosure, and thus operable in an access network including a base station, an SGW, and a PGW, where the PGW provides connectivity with a packet-switched network. As shown by way of example, the MME could include a network communication interface 42 (e.g., a wired or wireless Ethernet connection module) configured to engage in communication with entities including the base station and the SGW. Further, the MME could include a processing unit 44 (e.g., one or more microprocessors or specialized processors) and non-transitory data storage 46 (e.g., one or more volatile and/or non-volatile storage components, such as optical, magnetic, or flash storage), which could be integrated together in various ways. And as shown, the data storage could store program instructions 48 executable by the processing unit, which could be configured to cause the MME to carry out various MME operations described here.

In line with the discussion above, the operations could include engaging in connection pre-establishment signaling with the SGW to pre-establish a plurality of connections each including a respective S5 tunnel between the SGW and the PGW and each including a respective S11 tunnel between the MME and the SGW, the pre-established connections not being associated with any UEs. Further, the operations could include, after pre-establishing the connections, receiving from a UE, via the base station, an attach request. And the operations could include responding to the received attach request by (a) selecting one of the pre-established connections and (b) engaging in the above-described process to make the selected pre-established connection specific to the UE.

Exemplary embodiments have been described above. Those skilled in the art will understand, however, that changes and modifications may be made to these embodiments without departing from the true scope and spirit of the invention. For example, principles of the disclosure could be applied in other network configurations, possibly with respect to other types of bearers and other connections.

We claim:

1. A method operable in an access network comprising a base station, a serving gateway (SGW), and a packet-data-network gateway (PGW), wherein the PGW provides connectivity with a packet-switched network, the method comprising:
    pre-establishing in the access network a plurality of connections each including a respective S5 tunnel between the SGW and the PGW, wherein the pre-established connections are not associated with any user equipment devices (UEs);
    after pre-establishing in the access network the plurality of connections, receiving by the access network from a UE an attach request; and
    responsive to the received attach request, (i) selecting by the access network one of the pre-established connections, (ii) newly establishing for the UE an S1 tunnel between the base station and the SGW, (iii) causing the SGW to bridge the newly established S1 tunnel with the S5 tunnel of the selected pre-established connection, and (iv) causing the SGW, and in turn the PGW, to update context for the selected pre-established connection to indicate that the selected pre-established connection is specifically for the UE.

2. The method of claim 1, wherein pre-establishing each connection comprises pre-establishing for each connection the respective S5 tunnel between the SGW and the PGW,
    wherein updating context for the selected pre-established connection to indicate that the selected pre-established connection is specifically for the UE comprises recording at the SGW a correlation between the newly established S1 tunnel and the S5 tunnel pre-established for the selected pre-established connection.

3. The method of claim 2,
    wherein pre-establishing each connection comprises pre-establishing at the SGW an SGW context record for the connection and recording in the SGW context record a PGW tunnel endpoint identifier for the S5 tunnel pre-established for the connection, wherein the SGW context record is not associated with any UE; and
    wherein newly establishing for the UE the S1 tunnel comprises (i) establishing at the base station a base station context record for the connection and recording in the base station context record an SGW tunnel endpoint identifier for the S1 tunnel and (ii) recording in the SGW context record a base station tunnel endpoint identifier for the S1 tunnel.

4. The method of claim 3, wherein recording at the SGW the correlation between the newly established S1 tunnel and the S5 tunnel pre-established for the selected pre-established connection comprises recording the correlation in the SGW context record,
    whereby, in accordance with the correlation, the SGW then bridges between the newly established S1 tunnel and the S5 tunnel pre-established for the selected pre-established connection.

5. The method of claim 3, wherein the UE has a UE identification (UE ID), wherein updating context for the selected pre-established connection to indicate that the selected pre-established connection is specifically for the UE comprises recording in the SGW context record the UE ID, as an indication that the SGW context record, the S1 tunnel, and the S5 tunnel are now for the UE.

6. The method of claim 5,
    wherein pre-establishing each connection comprises pre-establishing at the PGW a PGW context record for the connection and recording in the PGW context record an SGW tunnel endpoint identifier for the respective pre-established S5 tunnel of the pre-established connection, wherein the PGW context record is not associated with any UE, and
    wherein updating context for the selected pre-established connection to indicate that the selected pre-established connection is specifically for the UE further comprises recording in the PGW context record the UE ID, as an indication that the PGW context record and the S5 tunnel are now for the UE.

7. The method of claim 6, wherein each pre-established connection has a respective assigned Internet Protocol (IP) address for communicating on the packet-switched network, wherein the PGW context record further indicates the IP address of the pre-established connection, whereby recording in the PGW context record the UE ID correlates the UE ID with the assigned IP address.

8. The method of claim 6, wherein each pre-established connection has a respective assigned Internet Protocol (IP) address for communicating on the packet-switched network, the method further comprising, responsive to the received attach request, assigning to the UE the respective assigned IP address of the selected pre-established connection.

9. The method of claim 8, wherein assigning to the UE the respective assigned IP address of the selected pre-established communication comprises transmitting to the UE an attach accept message that specifies the IP address as an IP address now assigned to the UE.

10. The method of claim 1, wherein pre-establishing the plurality of connections comprises projecting a quantity of connections based on historical connection-establishment trend data, and pre-establishing as the plurality of connections the projected quantity of connections.

11. The method of claim 1, wherein pre-establishing the plurality of connections comprises configuring each pre-established connection to have a respective quality of service level selected based on historical connection-establishment trend data.

12. A method operable in an access network comprising a base station, a serving gateway (SGW), a packet-data-network gateway (PGW), and a mobility management entity (MME), wherein the PGW provides connectivity with a packet-switched network, the method comprising:
    engaging by the MME in connection pre-establishment signaling with the SGW to pre-establish a plurality of connections each including a respective S5 tunnel between the SGW and the PGW and each including a respective S11 tunnel between the MME and the SGW, wherein the pre-established connections are not associated with any user equipment devices (UEs);
    after pre-establishing the connections, receiving by the MME from a UE, via the base station, an attach request; and
    responsive to the received attach request, (a) selecting by the MME one of the pre-established connections and (b) engaging by the MME in a process to make the selected pre-established connection specific to the UE, wherein the process includes:
(i) newly establishing for the UE an S1 tunnel between the base station and the SGW, and causing the SGW to bridge the newly established S1 tunnel with the S5 tunnel of the selected pre-established connection,
(ii) causing the SGW, and in turn the PGW, to update context records for the selected pre-established connection to indicate that the selected pre-established connection is specifically for the UE, and
(iii) updating a context record at the MME for the selected pre-established connection to indicate that the selected pre-established connection is specifically for the UE.

13. The method of claim 12, wherein each pre-established connection has a respective assigned Internet Protocol (IP) address for communicating on the packet-switched network, and wherein the process to make the selected pre-established connection specific to the UE further includes assigning to the UE the respective assigned IP address of the pre-established connection.

14. The method of claim 13, wherein assigning to the UE the respective assigned IP address of the pre-established connection comprises transmitting to the UE, in an attach accept message in response to the attach message, the assigned IP address, for use by the UE.

15. The method of claim 12, wherein the UE has a UE identifier (UE ID), and wherein updating the context records at the SGW, PGW, and MME comprises recording the UE ID in the context records.

16. The method of claim 12, wherein pre-establishing the plurality of connections comprises projecting a quantity of connections based on historical connection-establishment trend data, and pre-establishing as the plurality of connections the projected quantity of connections.

17. The method of claim 12, wherein pre-establishing the plurality of connections comprises configuring each pre-established connection to have a respective quality of service level selected based on historical connection-establishment trend data.

18. A mobility management entity (MME) operable in an access network comprising a base station, a serving gateway (SGW), and a packet-data-network gateway (PGW), wherein the PGW provides connectivity with a packet-switched network, the MME comprising:

a network communication interface configured to engage in communication with entities including the base station and the SGW;
a processing unit;
non-transitory data storage; and
program instructions stored in the non-transitory data storage and executable by the processing unit to cause the MME to carry out operations,
wherein the operations include engaging in connection pre-establishment signaling with the SGW to pre-establish a plurality of connections each including a respective S5 tunnel between the SGW and the PGW and each including a respective S11 tunnel between the MME and the SGW, the pre-established connections not being associated with any user equipment devices (UEs),
wherein the operations further include, after pre-establishing the connections, receiving from a UE, via the base station, an attach request,
wherein the operations further include responding to the received attach request by (a) selecting one of the pre-established connections and (b) engaging in a process to make the selected pre-established connection specific to the UE, and
wherein the process includes (i) newly establishing for the UE an S1 tunnel between the base station and the SGW, and causing the SGW to bridge the newly established S1 tunnel with the S5 tunnel of the selected pre-established connection, (ii) causing the SGW, and in turn the PGW, to update context records for the selected pre-established connection to indicate that the selected pre-established connection is specifically for the UE, and (iii) updating a context record at the MME for the selected pre-established connection to indicate that the selected pre-established connection is specifically for the UE.

19. The MME of claim 12, wherein each pre-established connection has a respective assigned Internet Protocol (IP) address for communicating on the packet-switched network, and wherein the process to make the selected pre-established connection specific to the UE further includes assigning to the UE the respective assigned IP address of the pre-established connection.

* * * * *